US012748624B2

(12) United States Patent
Rush et al.

(10) Patent No.: US 12,748,624 B2
(45) Date of Patent: Sep. 29, 2026

(54) VIRTUAL ENVIRONMENT COMPONENT DEPLOYMENT ANALYZER

(71) Applicant: THE HUNTINGTON NATIONAL BANK, Columbus, OH (US)

(72) Inventors: Brian Rush, Columbus, OH (US); Sekar Kumaraswamy Nalli, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/003,807

(22) Filed: Dec. 27, 2024

(65) Prior Publication Data

US 2026/0186827 A1 Jul. 2, 2026

(51) Int. Cl.
*G06F 9/48* (2006.01)
*G06F 9/455* (2018.01)

(52) U.S. Cl.
CPC ........ *G06F 9/4881* (2013.01); *G06F 9/45558* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 9,442,696 | B1 * | 9/2016 | Koh | G06F 8/00 |
| 12,169,727 | B2 * | 12/2024 | Lokesharadhya | G06F 9/5088 |
| 2024/0176637 | A1 * | 5/2024 | Ahlvin | G06F 9/5027 |
| 2024/0385877 | A1 * | 11/2024 | Fox | G06F 9/4401 |

FOREIGN PATENT DOCUMENTS

| | | | | |
|---|---|---|---|---|
| EP | 4296820 A1 * | 12/2023 | | G06F 9/5027 |
| WO | WO-2011162744 A1 * | 12/2011 | | G06F 8/61 |

* cited by examiner

*Primary Examiner* — Bradley A Teets
*Assistant Examiner* — Melissa A Headly
(74) *Attorney, Agent, or Firm* — Kilpatrick Townsend & Stockton LLP

(57) ABSTRACT

The disclosed technology relates to systems and methods for managing application startup within virtual environments. Operational requirements may be determined. A scheduler may receive a request for instantiating application instances that includes initialization parameters, which are analyzed by an external analyzer. The analyzer may generate an instantiation plan and instantiate the instances according to the plan.

20 Claims, 8 Drawing Sheets

201

- Total number of nodes to instantiate: 4
- - node_id: "node-01" and "node-02"
  cpu_allocated: "2 vCPUs"
  memory_allocated: "4 GB"
  application_id: "app-123", version: "1.2.3",
  priority: "high"
  dependencies:
  order: "1st"
  schedule: "immediate"
- - node_id: "node-03"
  cpu_allocated: "2 vCPUs"
  memory_allocated: "4 GB"
  application_id: "app-123", version: "1.2.3",
  order: 2nd
  priority: "medium"
  schedule: "delayed by time t" OR “node-01” instantiated
- - node_id: "node-04"
  cpu_allocated: "2 vCPUs"
  memory_allocated: "4 GB"
  application_id: "app-123", version: "1.2.3",
  order: 3rd
  priority: "medium"
  schedule: "delayed by time t" OR “node-02” instantiated
- fallback:
  retry_attempts: 3
  alternative_node: "node-03"
- monitoring:
  feedback: true
  metrics_collected:
  "cpu_usage"
  "memory_usage"
  "startup_latency"
- Process:
  API: true

FIG. 2A

VIRTUAL ENVIRONMENT COMPONENT DEPLOYMENT ANALYZER

BACKGROUND

The increasing reliance on virtual environments for deploying and managing applications has brought about significant challenges in resource allocation, application startup, and system stability. These virtual environments, including containerized platforms and cloud-based infrastructures, often operate at scale, managing hundreds or thousands of execution units (e.g., containers or virtual machines).

A common issue in such environments is the instability that arises during the startup phase of virtual components (e.g., virtual nodes, virtual applications, etc.). Applications, particularly resource-intensive ones, may demand spikes in CPU, memory, or I/O resources during initialization, leading to resource contention, inefficiencies, and even crashes. Once instantiated, applications typically stabilize and exhibit predictable resource usage. However, the startup phase remains a bottleneck for reliable and efficient operation.

TECHNICAL FIELD

This application is directed to management of virtual machines and more specifically to stable instantiation of applications during a startup phase.

SUMMARY

Aspects of the disclosed technology include a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for managing application startup within a virtual environment. The method also includes determining operational requirements of the virtual environment, the operational requirements related to instantiation of one or more instances of an application within the virtual environment. The method also includes receiving the request at a scheduler to instantiate one or more execution units corresponding to the one or more instances of the application within the virtual environment. The method also includes determining by a scheduler a number of execution units corresponding to the one or more instances of the application within the virtual environments to meet the operational requirements. The method also includes determining initialization parameters for the application at an external analyzer based at least in part on resource utilization of the application gathered from prior instantiations of the application. The method also includes generating, at the external analyzer, an instantiation plan to instantiate the one or more instances of the application on the one or more execution units based at least in part on the initialization parameters. The method also includes instantiating the one or more instances of the application on the one or more execution units based at least in part on the instantiation plan, where instantiating the one or more instances of the application includes initializing virtual resources for the one or more execution units and executing the one or more instances of the application. The method also includes monitoring the virtual environment for stability of the virtual environment after instantiating the number of execution units after instantiating the one or more instances of the application. Other embodiments of this aspect include corresponding computer systems, apparatus, and computer programs recorded on one or more computer storage devices, each configured to perform the actions of the methods.

Another general aspect includes a method performed by an external analyzer for optimizing application startup within a virtual environment. The method also includes receiving a request from a scheduler to instantiate a determined number of execution units, each execution unit executing a set of applications, within the virtual environment. The method also includes determining the initialization parameters based at least in part on resource requirements for instantiating the set of applications within the virtual environment and historical performance data for the set of applications. The method also includes generating a startup plan for instantiating one or more execution units to execute the determined number of applications within the virtual environment based at least in part on the initialization parameters. The method also includes transmitting the startup plan to the scheduler to cause the scheduler to instantiate the determined number of execution units within the virtual environment based on the startup plan. Other embodiments of this aspect include corresponding computer systems, apparatus, and computer programs recorded on one or more computer storage devices, each configured to perform the actions of the methods. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A is an example instantiation plan 201, in accordance with at least one embodiment of the disclosed technology;

DETAILED DESCRIPTION

Figure 1:
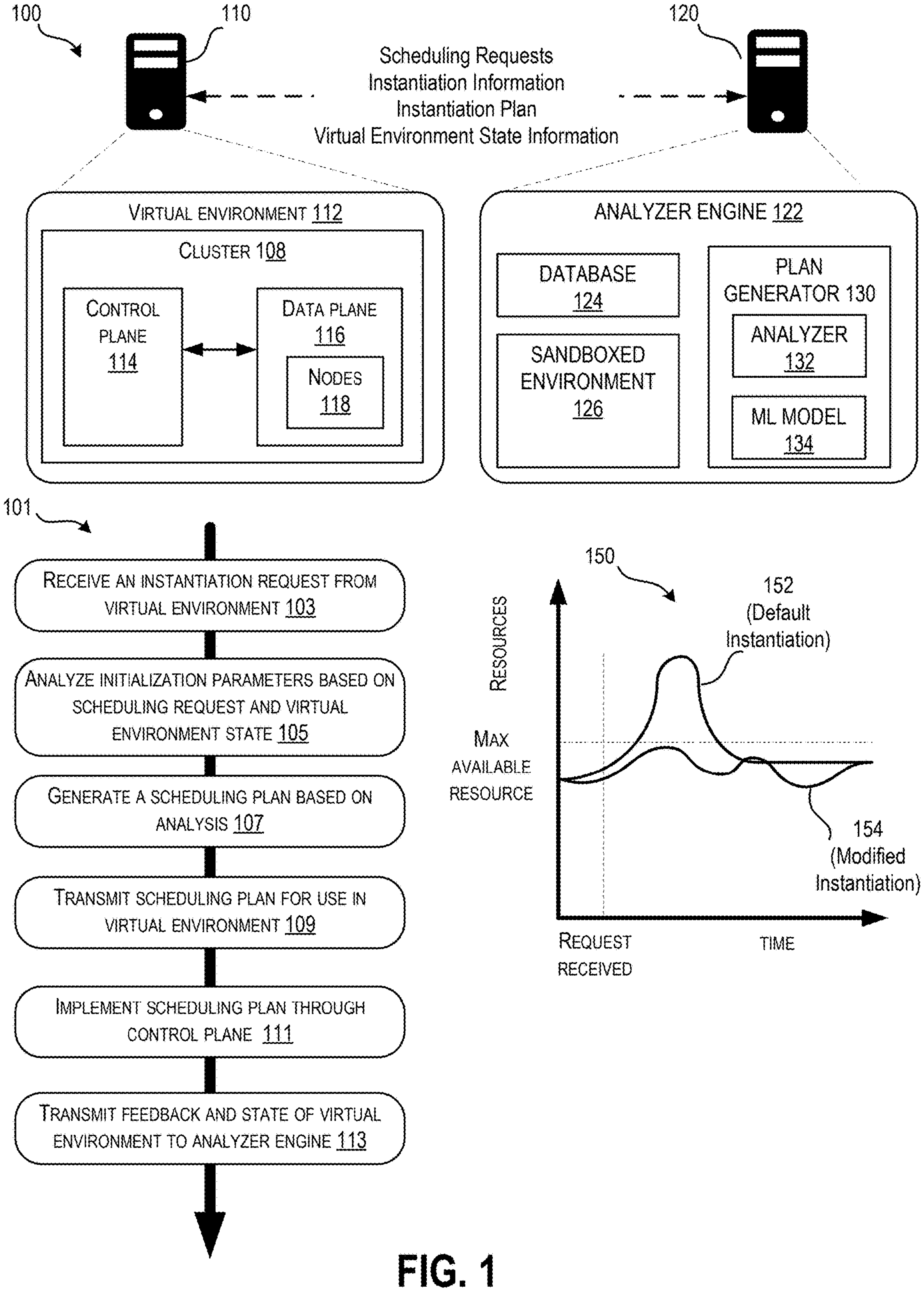
FIG. 1 is an example architecture for providing improved instantiation of virtual components, in accordance with at least one embodiment of the disclosed technology.

The increasing reliance on virtual environments for deploying and managing applications has created a significant need for systems that efficiently handle application initialization. A common issue in such environments is the instability that arises during the instantiation of virtual environment components (e.g., an application startup phase, instantiation of a node, launching applications within a node.) Such components (e.g., nodes, applications, microservices) may demand sharp spikes in CPU, memory, or I/O resources during instantiation or initialization. These resource demands can overwhelm the virtual environment, leading to resource contention, inefficient utilization, application crashes, or failure of one or more components of the virtual environment. While applications typically stabilize and exhibit predictable resource usage post-initialization, the startup phase can remain a bottleneck for reliable and efficient operation. This may occur due to a temporary spike when an application (or other virtual component) is being initialized or instantiated within a virtual environment.

Current virtual environment or virtual machine (VM) controllers do not account for the increase in demand during the instantiation of one or more virtual machine components (e.g., pods, applications, or other modular units). Currently, controllers (e.g., schedulers) may account for the available resources within a virtual environment (e.g., the CPU, memory, storage) to determine a number of instances of a virtual component to be present, they do not account for resource spikes which occur during the instantiation of the resource.

Current virtual environment controllers or VM controllers only account for a number of instances of virtual components (e.g., pods, applications, etc.) to be created based on a request and the available resources within the virtual environment. However, the controller may only provides commands to create such components and may not account for the process through which (including resource utilization) instantiation, updates, or other change to such components takes place.

The above discussed and other challenges are further exacerbated in large-scale deployments where multiple execution units (e.g., containers or virtual machines) are instantiated simultaneously. The interdependence of multiple components of a virtual machine increase the need for reliability of components and applications within the virtual environment. Resource spikes during initialization can cascade, creating system-wide instability and reducing the overall reliability of the environment. Current solutions for application instantiation rely on static resource allocation or heuristics-based scheduling. These approaches are inherently based on the "steady state" post-instantiation state of the components of the virtual environment and are not proactive in addressing issues which may arise during the instantiation of virtual components (e.g., pods, applications).

Thus, there is a need to provide an alternative framework which can integrate with current existing virtual environment frameworks and related workflows while overcoming the instability caused during the instantiation (or other changes to the environment).

The disclosed technology provides systems and methods for dynamically optimizing application startup within virtual environments, such as containerized orchestration systems (e.g., Kubernetes), to enhance reliability, efficiency, and predictability. Specifically, the disclosed technology addresses common issues arising during the initialization phase, including resource contention, instantiation failures, and inefficient resource utilization. By incorporating predictive analytics, feedback-driven refinements, adaptive scheduling, and the use of deployment plans the disclosed technology ensures stable application deployment even in high-demand scenarios (e.g., virtual environments in which components are often instantiated or deinstantiated).

The disclosed technology introduces a novel interaction between a scheduler, located in the control plane of a virtual environment, and an analyzer that processes resource and initialization requests. The analyzer evaluates real-time resource availability, historical resource usage patterns, and predicted startup demands. Based on this evaluation, the analyzer generates a scheduling plan that staggers or delays execution unit instantiations to prevent resource contention and ensures optimal utilization of available resources.

In one exemplary embodiment, the scheduler in the control plane is modified to query the analyzer before proceeding with instantiations. The scheduler sends initialization requests for one or more execution units to the analyzer, which determines whether the requested nodes or pods should be instantiated immediately or delayed. The analyzer may respond with an "unavailable" status for specific nodes or pods if prior instantiations must be completed as required by the scheduling plan. This approach enables the virtual environment to dynamically adapt to real-time resource conditions, ensuring that execution units are instantiated only when sufficient resources are available, thus minimizing failures and crashes.

In operation, the scheduler may send a request to the analyzer with details of the applications to be instantiated. The analyzer evaluates this request using predictive models and real-time monitoring data to generate an optimized scheduling plan. The plan may include recommendations such as staggering the instantiation of execution units or allocating additional resources to specific nodes. The analyzer sends the scheduling plan back to the scheduler, which then instantiates the execution units according to the plan.

Unlike conventional approaches, the disclosed technology eliminates the need for human operators to manually investigate failure points when initialization or scaling issues occur. Upon a failure, conventional methods may require manually checking the state of components in the virtual environment, such as nodes, resource allocation, or dependency conflicts. These checks are time-consuming, error-prone, and often necessary due to the randomness or semi-randomness of failure points during initialization (e.g., due to unknown or unaccounted for spikes in resource requirements). The disclosed system automates this process by leveraging the analyzer to dynamically prevent such issues real time. By proactively managing initialization states, the number of simultaneous instantiations, and only furthering a step on the scheduling plan after the initialization of a virtual component (e.g., an application) the system avoids unnecessary delays, failures, and/or reduces operational overhead.

The disclosed technology also incorporates a feedback loop from the virtual environment to the analyzer. Once the execution units are deployed, the virtual environment may provide performance metrics to the analyzer, such as resource usage, startup latency, and success rates. The analyzer uses this feedback to refine its predictive models and improve future scheduling plans.

The disclosed technology may also allow for an instantiation plan to be transmitted for display to a user or operator. The visualization may include information regarding the plan, bottlenecks, and efficiencies that may be implemented in the applications that are instantiated. The visualization may include detailed information about resource allocation, scheduling sequences, identified bottlenecks, and efficiencies integrated into the plan. For example, the visualization may highlight resource contention risks or suggest alternative strategies for improving application initialization, such as staggered deployments or adjusted resource allocations. As one example, a particular version of an application which causes failures during instantiation (e.g., an updated version with modified code) may be examined as a cause of failure. The system may present data related to the performance of specific application versions. For instance, if a particular version of an application (e.g., an updated version with modified code) consistently causes failures during instantiation, the visualization may flag this version and provide diagnostic insights. These insights may include root causes of the failure, such as excessive resource requirements, unaddressed dependencies, or unexpected initialization behavior. The visualization may also enable operators to perform "what-if" analyses, allowing them to simulate changes in the plan or adjust parameters, such as deployment timing, resource allocation, or node selection, to observe potential impacts on system performance. Moreover, the system may incorporate historical and real-time feedback into the visualization, enabling users to evaluate trends and identify persistent issues that impact efficiency or reliability.

The disclosed systems and methods provide several advantages over conventional approaches. By leveraging the analyzer's predictive capabilities and dynamic feedback, the disclosed technology may reduce startup failures, improves resource efficiency, and ensures more reliable application initialization. Furthermore, the integration of the scheduler and analyzer with the control plane enhances security by isolating the initialization process and mitigating vulnerabilities associated with resource contention.

The disclosed technology may be useful in large-scale virtual environments, where multiple execution units must be instantiated simultaneously or in rapid succession. By dynamically adjusting the scheduling plan based on real-time conditions, the disclosed technology ensures that application startups are handled smoothly, even in high-demand or resource-constrained scenarios. Thus, the overall resources of the virtual environment may be more optimally used without heuristically allocating resources to account for the excessive overhead required during instantiation. The resources of the virtual environment may be used more optimally (e.g., instantiating and de-instantiating nodes, applications, or other virtual resources according to demand or current needs, while preserving stability of the virtual environment).

A use case for the disclosed technology involves updates to application versions within nodes and/or pods (e.g., within a containerized architecture such as Kubernetes). For example, when a version update is required, older versions of the application may be deactivated, and new pods hosting the updated version may be instantiated. This process may ensure that the virtual environment avoids simultaneous initialization of conflicting versions, thereby reducing resource contention and improving operational stability. Another use case includes scaling the number of application instances based on real-time demand. For instance, when user traffic increases or other demands on the virtual environment increase, additional pods hosting the application may be created to distribute the load.

In such scenarios, the scheduler in the control plane collaborates with an analyzer to ensure efficient and reliable operations. The scheduler may sends initialization requests for new or updated pods to the analyzer. The initialization request may include the number of pods and the expected resource requirements for the pod. The analyzer may evaluate the resource landscape, including available CPU, memory, and other resources, and may determine whether the entire number of requested pods can be instantiated immediately or whether the instantiation should be delayed and/or staggered. If resources are insufficient, the analyzer may return an "unavailable" response, indicating that certain pods or nodes must remain in a pending state until sufficient resources are available or prior pods have been fully instantiated according to the scheduling plan.

For example, in a high-traffic or high demand scenario, additional pods for an e-commerce application can be instantiated in real time, distributing the load effectively without overloading the available nodes. Similarly, during an enterprise-wide version update, the disclosed technology ensures that updates are rolled out incrementally (e.g., terminating older verisons of an application or pod, and replacing with newer verisons), avoiding simultaneous startup of the newer versions (which may lead to a crash of the virtual environment or components thereof). This process improves reliability, prevents crashes, and maintains operational continuity of the virtual environment.

The techniques described herein, including those described in the particular example, may provide multiple technical improvements, benefits, and advantages compared to prior solutions for application instantiation and scaling in virtual environments. For example, conventional systems rely heavily on static resource allocation and predefined scheduling rules. Such methods often require manual intervention to investigate failures during application initialization or scaling, particularly when resource contention or dependency conflicts arise. These manual processes are not only time-consuming but also prone to human error, and they fail to provide a consistent or proactive solution to startup challenges. In contrast, the disclosed technology integrates dynamic scheduling with a feedback-driven analyzer, eliminating the need for manual state checks or resource debugging during the instantiation process. For instance, instead of manually identifying and resolving failures related to resource contention or node availability, the system automatically queries the analyzer to evaluate resource conditions in real time. The analyzer ensures that applications or pods are instantiated only when sufficient resources are available, thereby reducing startup failures and improving reliability. Additionally, conventional systems do not support proactive scaling based on predicted resource demand or historical patterns. Scaling often requires administrators to monitor traffic or resource usage manually and then provision additional instances reactively. The disclosed technology automates this process, enabling the dynamic instantiation of additional pods or the rolling update of application versions without impacting ongoing operations.

As discussed in further detail below, the following systems and methods illustrate exemplary implementations of the disclosed technology. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

I. Example Architecture and Flow

FIG. 1 is an example architecture for providing improved instantiation of virtual components, in accordance with at least one embodiment of the disclosed technology. FIG. 1 illustrates an architecture 100 and an example flow 101 in accordance with at least one embodiment of the disclosed technology.

The architecture 100 may include a virtual environment computing device 110 and an analyzer computing device 120. The architecture 100 may provide a system for managing application instantiation, resource optimization, and scaling within a virtual environment. The architecture 100 may include various computing devices, components, and software modules that enable efficient scheduling, resource allocation, and the proactive management of application workloads. This system facilitates dynamic interactions between the virtual environment computing device 110 and the analyzer computing device 120, ensuring reliable and scalable application deployment. In some examples, architecture 100 may be configured to include container orchestration software (e.g., Kubernetes). In some examples, architecture 100 may be configured to include container orchestration software, such as Kubernetes, to be launched on top of a virtual environment (e.g., Kubernetes on a virtual machine) to manage the deployment, scaling, and operation of containerized applications within the virtual environment. This software may facilitate the efficient distribution of workloads across nodes, manage resource allocation, and provide fault tolerance through automated recovery mechanisms. Kubernetes, for instance, may enable architecture 100 to orchestrate multiple containers within pods, ensuring that applications are deployed and operated in a manner that optimizes resource usage and system performance.

The virtual environment computing device 110 may include a virtual environment 112. The virtual environment may be distributed across one or more clusters, such as a cluster 108. A cluster may be a set of virtual machines, physical machines, and/or other computing devices and resources which have been assigned to a specific virtual environment and provide a set of capabilities. The cluster 108 may include and/or instantiate a control plane 114 which is in communication with a data plane 116. The data plane 116 may contain one or more nodes 118. The analyzer computing device 120 may include an analyzer engine 122. The analyzer engine may include a number of example components, such as a database 124, a sandboxed environment 126, and a plan generator 130. The plan generator 130 may further include an analyzer 132 and a ML model 134. In some examples, the virtual environment computing device 110 and the analyzer computing device 120 may be separate components. However, in some examples, the virtual environment computing device 110 and the analyzer computing device 120 may have overlapping components, be instantiated as separate physical and/or virtual machines on a virtual cloud environment, or be the same server and/or platform. In some examples, an API may be used to facilitate communication between the analyzer computing device 120 and the virtual environment computing device 110.

Cluster 108 may be a group of devices. A cluster may refer to a group of interconnected computing devices (physical or virtual machines) that work together to run containerized applications, managed by a control plane, allowing for distributed deployment and management of workloads across multiple machines within the cluster. A collection of computing devices on which an orchestrated containerized applications is running may be a cluster.

The virtual environment computing device 110 may be a computing system or a collection of distributed systems configured to manage the instantiation and execution of applications, such as pods, containers, or virtual machines. It provides an operational environment for deploying workloads while handling resource scheduling, resource isolation, and system-level communications. The virtual environment computing device 110 may operate as part of a containerized orchestration platform (e.g., Kubernetes) and can span physical and virtual infrastructures, including hybrid or cloud-based deployments.

The virtual environment 112 may be instantiated as a managed computing infrastructure where applications and workloads may be deployed, executed, and monitored. This environment may include a collection of distributed nodes, containers, virtual machines, or other execution units orchestrated by the control plane 114. The virtual environment 112 may provide mechanisms for resource allocation, workload scheduling, and system monitoring, leveraging the data plane 116 to handle the execution of tasks and processes within nodes 118. Applications or workloads may be instantiated in the virtual environment 112 dynamically based on workload demands, integrating with the analyzer computing device 120 to generate optimized scheduling plans. This may ensure resource contention is managed, and workload prioritization is performed efficiently. The virtual environment 112 may be suited for high-demand scenarios, including cloud computing, container orchestration, or hybrid deployments, enabling scalability and adaptability to changing requirements.

The control plane 114 which may be included in the virtual environment may be responsible for orchestrating and managing the operations of the virtual environment. This may also include scheduling execution units, assigning resources, and managing communication between nodes. As further explained herein, the control plane 114 may also integrate with the analyzer computing device 120 to query initialization plans for nodes, pods, applications, or other components. The control plane 114 ensures that instantiation follows an optimized plan, thereby reducing failures caused by resource contention.

The data plane 116 may handle the execution of workloads, comprising the processes, containers, or virtual machines that perform assigned tasks or workloads. It includes multiple nodes 118, which are distributed systems or servers where execution units reside. The data plane 116 implements the decisions made by the control plane 114, ensuring that the workloads are executed efficiently within the available resource constraints.

The enterprise platform 110 may be a platform which may be used for the development, management, and/or deployment of one or more applications and/or features related to the one or more applications. The enterprise platform 110 may contain a combination of hardware and/or software components which may allow for the development, troubleshooting, versioning, deployment, testing, and security analysis of the example applications and features described herein.

The analyzer computing device 120 may be a specialized system that provides real-time analysis and optimization capabilities for the virtual environment. It evaluates requests from the control plane 114, processes resource availability, and generates optimized scheduling plans. The analyzer computing device 120 may include both hardware and software components that enable predictive analytics, resource simulation, and workload prioritization.

The analyzer engine 122 may be a component of the analyzer computing device 120 and may include several subsystems that may collaborate to evaluate resource requests and generate one or more scheduling plans for the virtual environment. The analyzer engine 122 may comprise a database 124, a sandboxed environment 126, a plan generator 130, an analyzer module 132, and an ML model 134.

The database 124 may be a integrated within the analyzer engine 122 to enable analysis and optimization of one or more aspects of the virtual environment. The database 124 may be configured to store and manage a range of historical and real-time data which may be used in generating scheduling plans or instantiation plans. This data may include information about how specific applications are launched, such as their typical resource requirements, initialization times, startup behavior (e.g., a spike in CPU, memory, or storage beyond a “steady state” of the virtual component), and patterns of resource usage during startup phases. Additionally, the database 124 may maintain records of an instantiation frequency, capturing how often particular applications are instantiated within the virtual environment. This may be used to help identify workload trends. The database 124 may also store a detailed history of failures encountered during virtual environment component (e.g., applications, nodes, microservices, or pods) initialization, including resource conditions, contention points, resource usage, and other factors. This failure history may enable the analyzer engine 122 to proactively avoid similar issues during future deployments or instantiations of the application.

The database may include version history for applications, ensuring compatibility during updates and preventing simultaneous deployment of conflicting versions. It may also store node-specific data, such as information about other applications or workloads currently present on a node, their resource consumption patterns, and their operational states. This node-specific data may ensure that new applications are launched only when sufficient resources are available and existing workloads are not disrupted. To support predictive analysis and dynamic resource management, the database 124 may maintain resource utilization trends, including metrics related to CPU, memory, and I/O usage. This data may help the system anticipate periods of high demand or identify underutilized resources. Additionally, the database 124 may include inter-application dependency data, detailing how applications interact with or rely on other workloads in the environment. This information may enable the analyzer to coordinate dependent application launches to prevent failures and ensure operational continuity. Integrated with the broader architecture, the database 124 may support versioning and lifecycle management of its stored data, ensuring that critical information remains accessible while outdated records are archived. By leveraging this comprehensive dataset, the database 124 may empower the analyzer computing device 120 to enhance the reliability, efficiency, and scalability of the virtual environment, ultimately enabling smoother application initialization, resource allocation, and scaling the running processes.

The database 124 may implement mechanisms for efficient data storage, retrieval, and versioning. Data may be saved in formats such as relational databases, distributed object storage systems, or file-based logs, depending on the type and volume of data. Lifecycle management features may ensure that outdated or less relevant data is archived, while more recent operational data is retained and easily accessible. Data may also be periodically backed up to prevent loss and ensure system resilience.

In addition to supporting real-time operational decisions, the data stored in the database 124 may be used to train machine learning models, such as the ML model 134 within the analyzer engine 122. For example, the database 124 may include labeled datasets containing resource usage patterns, application performance metrics, and failure cases, which may serve as training data for the machine learning model. By leveraging this data, the ML model may continuously improve its predictions and recommendations for resource allocation and workload prioritization.

The sandboxed environment 126 may be a critical component of the analyzer engine 122, providing a controlled and isolated space to simulate the instantiation of nodes or applications within various virtual machines. Unlike the live deployment side, the sandboxed environment 126 may be configured to operate independently, allowing it to observe, analyze, and characterize the startup behavior of applications without affecting the operational state of the virtual environment. The data generated from these simulations may be transmitted to the database 124 for storage and further analysis.

In some examples, upon the generation or provision of a new version of an application, the sandboxed environment 126 may receive this version for testing. The environment may simulate the startup process of the application to evaluate its behavior under various conditions. This may include testing for non-linearities in resource requirements during startup, identifying specific characteristics of the startup process (e.g., time to reach stability, CPU and memory utilization patterns), and graphing or analyzing resource peaks. For example, the sandboxed environment 126 may generate a startup profile that includes detailed information about the resource usage over time, highlighting any spikes or bottlenecks that may occur during initialization. It may also simulate the existing virtual environment with its available resources to determine whether an instantiation plan is successful in making the virtual environment stable.

The sandboxed environment 126 may also be used to test and validate certain resource allocation plans prior to their implementation in the live environment. For instance, it may evaluate the effectiveness of staggered or delayed instantiation plans by simulating their execution and analyzing their impact on resource contention and application stability. By testing these plans in a sandboxed setting, the system may identify and refine the most efficient strategies before applying them to the live environment, thereby minimizing the risk of failures or performance degradation.

Additionally, the sandboxed environment 126 may determine the variability in application startups by running multiple simulations under different conditions. This may include introducing variations in resource availability, workload demands, or node configurations to evaluate how consistently an application can be instantiated. Understanding this variability may enable the system to proactively account for unpredictable behaviors and incorporate failsafes into the scheduling plan.

The data collected from the sandboxed environment 126 may be transmitted to the database 124 and integrated into the broader analytics performed by the analyzer engine 122. This data may include startup characteristics, performance metrics, and the results of tested allocation plans. By feeding this information back, the sandboxed environment 126 may help train the ML model 134, improving its ability to predict resource usage and optimize scheduling decisions.

By simulating startup processes and testing allocation strategies, the sandboxed environment 126 may provide a safe and efficient way to refine application deployment processes, reduce variability, and enhance the overall reliability and efficiency of the virtual environment 112.

The plan generator 130 may be configured to create optimized scheduling plans for the virtual environment by analyzing inputs received from the control plane 114 and leveraging data retrieved from the database 124. The plan generator 130 may serve as a module responsible for translating resource requirements and operational goals into actionable scheduling strategies that can be implemented in the live environment. By working in conjunction with the analyzer module 132 and the ML model 134, the plan generator 130 may determine a resource allocation strategy to meet the demands of application instantiation or node instantiation.

To generate a scheduling plan (also referred to as an instantiation plan), the plan generator 130 may process information provided by the control plane 114, such as resource requests for specific applications, the current state of nodes in the virtual environment, the overall resources of the virtual environment, allocated resources for a particular task (e.g., a certain set of applications) and any constraints or dependencies associated with the requested workloads. This real-time input may be supplemented with historical and analytical data retrieved from the database 124, including resource usage patterns, failure histories, and inter-application dependencies.

The plan generator 130 may incorporate machine learning insights from the ML model 134 to predict resource requirements, identify potential contention points, and evaluate the likely success of different scheduling scenarios. For example, the plan generator 130 may consider the resource spikes observed during application startups, as identified in the sandboxed environment 126, to determine whether a staggered deployment strategy is required. It may also factor in variability in startup behavior to account for potential inconsistencies in resource usage. The plan generator may also use information from the analyzer module 132.

The plan generator 130 may create a scheduling plan (or an instantiation plan) that includes details such as the timing of instantiations, how many nodes, applications, or other components may be instantiated at a given quantum of time or moment of time, the time to wait between instantiations, the expected steady state resource utilization of the components, and any constraints to prevent resource contention. In some examples, multiple plans may be generated at once, and may also incorporate preemptive strategies, such as reserving resources for high-priority applications or delaying lower-priority workloads to ensure the stability of the virtual environment.

The scheduling plans generated by the plan generator 130 may also be tested in the sandboxed environment 126 to evaluate their effectiveness before being deployed in the live environment. This iterative process ensures that the plans are robust and adaptable to real-world conditions, reducing the risk of failures or resource inefficiencies.

The analyzer module 132 and the ML model 134 may work together within the plan generator 130 to evaluate resource availability, predict workload demands, and generate efficient scheduling plans for the virtual environment. These components may collaborate to ensure that resource allocation strategies align with the operational needs of the system while adapting to real-time conditions and historical trends.

The analyzer module 132 may evaluate the resource landscape by analyzing both current and past data. It may process information related to the state of nodes, resource utilization, and active workloads within the virtual environment. By leveraging data retrieved from the database 124, the analyzer module 132 may assess workload requirements, identify dependencies between applications, and determine the most effective allocation of resources. The module may ensure that generated scheduling plans are optimized to avoid resource contention, reduce startup variability, and meet the performance requirements of the environment.

The ML model 134 may enhance the capabilities of the analyzer module 132 by incorporating machine learning techniques to analyze complex patterns and trends. It may predict resource utilization trends based on historical data, allowing the system to anticipate future demands and preemptively allocate resources. The ML model 134 may also identify potential contention points, such as resource spikes or bottlenecks during application startups, and provide insights into how to mitigate these issues.

In addition to analyzing static conditions, the ML model 134 may continually adapt based on feedback received from the virtual environment. For instance, data on the success or failure of previous scheduling plans, variability in application startups, and real-time resource utilization may be fed back into the model to refine its predictions. This adaptive learning process may improve the accuracy and reliability of future scheduling decisions, enabling the system to respond dynamically to changing conditions.

Together, the analyzer module 132 and the ML model 134 may form the analytical backbone of the analyzer engine 122, ensuring that scheduling plans are not only efficient but also responsive to the needs of the virtual environment. By combining real-time analysis, historical performance data, and predictive modeling, these components may enable proactive resource management, reduce initialization failures, and improve the overall scalability and reliability of the system.

For clarity, other components of the architecture 100 are not illustrated. This includes one or more APIs which may be used internally within the architecture 100. As non-limiting examples, the virtual environment may contain internal load balancers and external load balancers.

FIG. 1 also illustrates a process 101 according to examples of the disclosed technology. The process 101 may be performed on one or more components of the architecture 100 described above. The architecture 100 can be used to scale nodes or other components within the virtual environment 112. As one example, a pre-determined number of nodes 118 within the virtual environment 112 are to be instantiated. This may occur in response to an external request (example, additional demands for the resources of the virtual environment 112) or in response to another command (e.g., updating the version of one or more applications which belong to the nodes 118 which may require terminated and then instantiated with the new version of the application.) In these examples the control plane 114 may receive this request and determine a number of nodes that may be instantiated to meet the request. However, the control plane may simply provide to a scheduler this request without accounting for bottlenecks or an overload on the resources of the virtual environment, leading to errors, crashes, or "hung" nodes.

At 103, a request for application instantiation may be received from the virtual environment 112 at the control plane 114. For example, the control plane may identify a request to instantiate one or more applications, which may include allocating resources or initializing nodes to host the applications. These requests may originate from external demands, such as user traffic spikes, or from scheduled updates to applications.

At 105, the initialization parameters of the requested application may be analyzed by the analyzer computing device 120. The request and the current state of the virtual environment, including resource availability and workload distribution, may be processed by the analyzer module 132. Using data retrieved from the database 124, including historical trends and failure records, and leveraging the ML model 134, the analyzer may evaluate resource requirements and potential bottlenecks. The sandboxed environment 126 may simulate the startup of the application to assess potential variability and resource peaks, providing additional insights for plan refinement.

At 107, the plan generator 130 may generate an optimized scheduling plan based on the analysis conducted at step 105. This plan may include decisions such as which nodes to allocate for the instantiation, whether the application should be staggered or delayed, and how resources should be distributed to prevent contention. The scheduling plan may also consider inter-application dependencies and real-time feedback from the virtual environment to ensure reliable deployment.

At 109, the optimized scheduling plan may be transmitted to the control plane 114 for execution. The control plane may implement the scheduling plan by instantiating the application on designated nodes within the data plane 116. This may involve initializing containers, allocating CPU and memory resources, and coordinating with other components of the virtual environment to ensure that the deployment follows the specified plan.

At 111, the scheduling plan may be implemented within the virtual environment 112. The control plane may ensure that all applications are instantiated according to the plan, dynamically monitoring the progress of each initialization process to verify stability. Any deviations or issues during the instantiation may trigger adjustments in real time to maintain operational reliability.

At 113, feedback regarding the state of the virtual environment may be transmitted back to the analyzer computing device 120. This feedback may include metrics such as resource utilization, application startup times, and success or failure rates. The data may be stored in the database 124 and used to refine future scheduling plans. The feedback may also train the ML model 134, enabling it to improve predictions and recommendations for resource allocation and scaling.

Referring now to graph 150, aspects of the disclosed technology are disclosed. Graph 150 illustrates "time" on the horizontal axis while "resources" are illustrated on the vertical axis. The maximum available resource for a particular virtual environment is also illustrated in a dashed horizontal line. The time at which a request is received for the virtual environment is also illustrated in a vertical dashed line. The "default instantion" process is illustrated in with curve 152. During the instantiation process in curve 152, there may be an uptick of the required resources which exceeds the maximum available resources. In the area above the maximum available resources line, various failures may be experienced in the virtual environment. These failures may include "hung" or inoperable nodes or applications, unresponsive nodes or applications, partially generated nodes, crashed nodes, or other nodes. The peak may occur due to an uptick in the resources required to instantiate a node which are different than the "steady state" of the node which occurs after instantiation. Thus, when the virtual environment attempts to instantiate all of the nodes at once, the virtual environment is overloaded.

Curve 154 illustrates a modified instantiation, such as when the analyzer engine 122 is used to generate an instantiation plan. In this instantiation process, staggering of the instantiation of nodes may take place. By staggering the instantiation of each node (or group of nodes), a node may first be instantiated prior to additional nodes being instantiated. This may include for example, waiting and confirming that a node has achieved a steady state before "releasing" another node for instantiation. In other examples, based on heuristics or other historical data, the scheduling plan may take the maximum time it takes for a node to achieve a "steady state" and use that as a gap between instantiations. In other examples, the average value may be used. In other examples, the "closeness" or the available difference between the maximum available resource and the current resource state may be used to determine the instantiation plan. For instance, when there is relativity large amount of resources available, a large number of nodes may be instantiated at once. This may ensure that the number of instantiations is achieved as quickly as possible without overloading the virtual environment. However, when there is relativity little overhead, a fewer number of nodes may be instantiated at a time to prevent going over the maximum available resources and overloading the virtual environment. In other examples, staggered instantiations may take place.

As one example of using the architecture 100, consider a payments team at an enterprise may that develop a payments application. During certain times, additional payment functionality may be required to scale out within the virtual environment (e.g., during a large shopping event such as Christmas or New Years). The specific application and/or node related to the payment functionality may require additional instantiations within the virtual environment. The control plane 114 may determine the number of instantiations that are required. This information may be passed to the analyzer engine 122 to generate a plan. The analyzer engine 122 may pass the generated instantiation plan to the control plane 114 for deployment. In other examples, the control plane 114 may have access the instantiation plan via an API. The analyzer engine may "release" or mark as available a certain node according to the plan (e.g., based on time values) or based on the current state of the virtual environment (e.g., monitoring that a node has been instantiated and has achieved a steady state). In some examples, it may be helpful to do a mass replacement of workloads (e.g., pods) due to update the base image (e.g., patching) of the workloads. In this example (e.g., during mass replacement with new images), the scheduling may be throttled.

II. Example Instantiation Plan and Architecture

FIG. 2A is an example instantiation plan 201, in accordance with at least one embodiment of the disclosed technology. The instantiation plan 201 may be a file or other digital representation which may be generated by one or more components described herein, including but not limited to the analyzer engine 122 or the plan generator 130. The illustrated instantiation plan 201 is a simplified plan for illustrative purposes. However, a person of skill in the art will appreciate that variations of the instantiation plan 201 may be possible. As one example, multiple nodes may be instantiated at one time, the time between instantiating nodes may be dynamic or fixed, or based on a feedback loop, or conditional (e.g., receiving a message or other indication that a node has been instantiated.)

The instantiation plan 201 may be generated by the plan generator 130 and may be a structured output that specifies how, when, and where applications or nodes within the virtual environment 112 should be instantiated to optimize system stability while ensuring and maintain system stability. The instantiation plan may include various elements and parameters designed to ensure instantiation while minimizing resource contention and startup failures.

The plan may detail the allocation of nodes, such as node-01, node-02, and others, and may define the resource distribution for each node. For example, the plan may specify that 2 vCPUs and 4 GB of memory are allocated for each node hosting a specific application, such as "app-123," along with its version, such as "1.2.3." Additionally, the instantiation plan may include prioritization rules, ensuring that high-priority applications are instantiated immediately, while medium- or low-priority workloads are scheduled with staggered or delayed timings to avoid resource contention. While this is one example, at times instantiation plan 201 may not include specific details of the application being generated or the configuration of the node, and may only contain a high level scheduling plan of the nodes.

The instantiation plan 201 may also account for dependencies between nodes. For instance, it may specify that certain nodes or applications must be instantiated in a specific sequence to ensure the proper functioning of dependent tasks. For example, "node-01" may be designated to instantiate first, with "node-03" and "node-04" only being instantiated after "node-01" has completed initialization. This ensures that dependencies may be resolved and resource utilization is optimized. However, when the nodes are just copies of one another, the instantiation plan 201 may also include conditions which must be met prior to instantiating the next node.

In cases where resource availability or contention may impact deployment, the plan includes fallback mechanisms. It specifies the number of retry attempts for failed instantiations (e.g., three retries) and provides alternative nodes to which the workloads may be reassigned if the primary nodes are unavailable. For instance, if "node-01" encounters an error, the plan may redirect the workload to "node-03" as a backup. To ensure the effectiveness of the instantiation process, the plan incorporates monitoring and feedback mechanisms. Real-time metrics, such as CPU usage, memory usage, and startup latency, may be collected during deployment and transmitted to the database 124. This feedback helps refine future scheduling strategies, allowing the system to learn from operational data and improve resource allocation decisions. Additionally, the plan supports interaction with APIs, allowing the virtual environment to dynamically adjust resource allocations or deployment schedules based on real-time conditions. By providing a detailed and flexible framework for resource management, the instantiation plan 201 enables the virtual environment to scale efficiently, ensuring reliable application performance even under varying workload demands. This approach allows the instantiation plan to bridge the gap between the high-level request for resources from the virtual environment and the low-level execution of deployment strategies, providing a comprehensive and adaptive method for managing workloads in dynamic and complex virtualized systems.

Figure 2B:
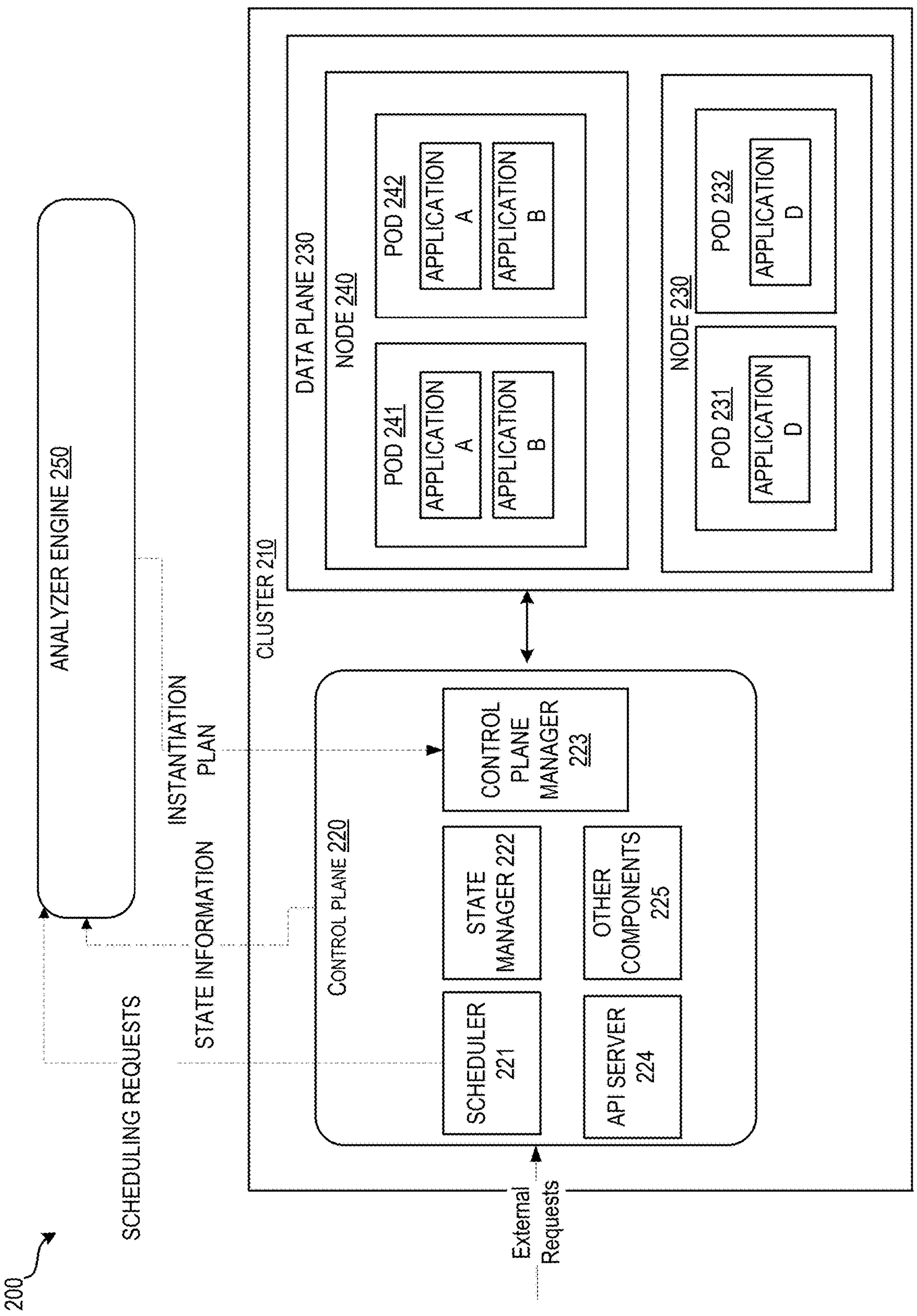
FIG. 2B is an example framework, 200, in accordance with at least one embodiment of the disclosed technology.

FIG. 2B is an example framework, 200, in accordance with at least one embodiment. The framework 200 may include a cluster 210 and an analyzer engine 250. The cluster 210 may be a portion of a virtual environment (e.g., the virtual environment 112). In some examples, the framework 200 may be a container orchestration platform such as Kubernetes.

The control plane 220 may serve as the centralized management layer of the cluster 210, orchestrating all operations within the cluster. It may process external requests, manage resource allocation, and ensure the smooth execution of workloads within the data plane 230. The control plane 220 may include a scheduler 221, a state manager 222, a control plane manager 223, an API server, and other components 225. For simplicity, not each component of the virtual machine is not illustrated.

The scheduler 221 may receive external requests and determine the optimal placement of workloads, such as applications or containers, within the nodes of the data plane 230. The scheduler may communicate with the analyzer engine 250 to retrieve optimized scheduling plans, ensuring resource contention is minimized and application requirements are met. The scheduler 221 in the virtual environment may be responsible for managing the placement of workloads, such as applications, pods, or containers, across the nodes within the data plane 230. The scheduler 221 may decide which nodes should host one or more requested workloads based on current resource availability, workload requirements, and predefined policies or constraints. The scheduler does not directly execute workloads and may instead determine where and how the nodes, pods, applications, (or other virtual environment components) should be instantiated, delegating the execution to other components of the control plane, such as the controller manager 222. In some examples, a pod may be "predefined" according to a template, an application or a group of applications (or other execution units) may be instantiated when the pod is instantiated and initialized.

The state manager 222 may monitor the state of the cluster or components thereof, ensuring that the desired state of the system matches its actual state. For example, if a node fails or a container crashes, the controller manager may trigger the instantiation of new nodes or containers to maintain desired levels of performance and availability.

The control plane manager 223 may coordinate the operations of various components within the control plane 220. This may include managing communications between the scheduler 221, the state manager 222, and the API server 224.

The API server 224 may provide an interface for external systems or users to interact with the cluster 210. For example, external requests for application deployment, updates, or scaling may be received through the API server and processed by the control plane components.

The additional components 225 within the control plane 220 may include resource monitors, logging systems, and networking modules that support the cluster's operations.

The data plane 230 may handle the actual execution of workloads within the cluster 210. It may include multiple nodes (e.g., node 240 and node 230), each of which may host one or more pods or containers.

Nodes, such as node 240 and node 230, may represent physical or virtual machines within the cluster. Each node may provide compute resources (e.g., CPU, memory, storage) for running workloads. In some examples, a node may represent physical hardware upon which a virtual machine is running. In other examples, the nodes may be virtual machines with predefined resource availability.

Pods, such as pod 241, pod 242, pod 231, and pod 232, may represent the smallest deployable units in the cluster, hosting one or more applications. For example, pod 241 and pod 242 may each host Application A, while pod 231 and pod 232 may each host Application D. The data plane 230 may ensure that these pods operate in accordance with the scheduling and resource allocation decisions made by the control plane 220. In some examples, a specific pod is preconfigured to only execute a particular application, a group of applications, or a group of applications and related dependencies (e.g., microservices).

The analyzer engine 250 may be similar to the analyzer engine 122. Additional aspects of the analyzer engine 250 may be further descried with respect to FIG. 3. Although not every component of the analyzer engine 250 is described herein, it may contain any of the components and/or functionality described herein. The analyzer engine 250 may work in conjunction with the scheduler 221 and the control plane manager 223 to provide real-time recommendations for resource allocation and workload placement. The analyzer engine 250 may generate instantiation plans, analyze feedback from the cluster 210, and ensure that applications are deployed in a way that minimizes failures and resource contention. The analyzer engine 250 may be in data communication with the cluster 210 and/or the control plane 220 through secure API calls.

As an example, the control plane 220 may receive a request for a specific resource to be provided by the cluster 210. This may be an external request (e.g., an external load balancer receiving a number of requests, which are load balanced) or an internal request (a determination from an internal load balancer that performance metrics are not being met). The load balancer be a part of the control plane 220. The load balancer may distribute incoming network traffic across multiple servers and resources within the system to optimize resource use, reduce latency, and ensure high availability. The load balancer ensures that the system can handle high traffic volumes and maintain performance under load.

The scheduler 221 may determine that a number of nodes are required to meet the request. The scheduler 221 may interact with the analyzer engine 250 to request an instnation plan for the nodes. The instantion plan may be similar to the instnation plan 201. Based on the scheduling plan, the controller manager 222 and control plane manager 223 may coordinate the deployment of pods or containers to nodes within the data plane 230. As workloads are executed, real-time feedback (e.g., resource utilization metrics, workload performance) may be transmitted from the nodes back to the analyzer engine 250. This feedback may be used to refine future scheduling decisions.

Figure 3:
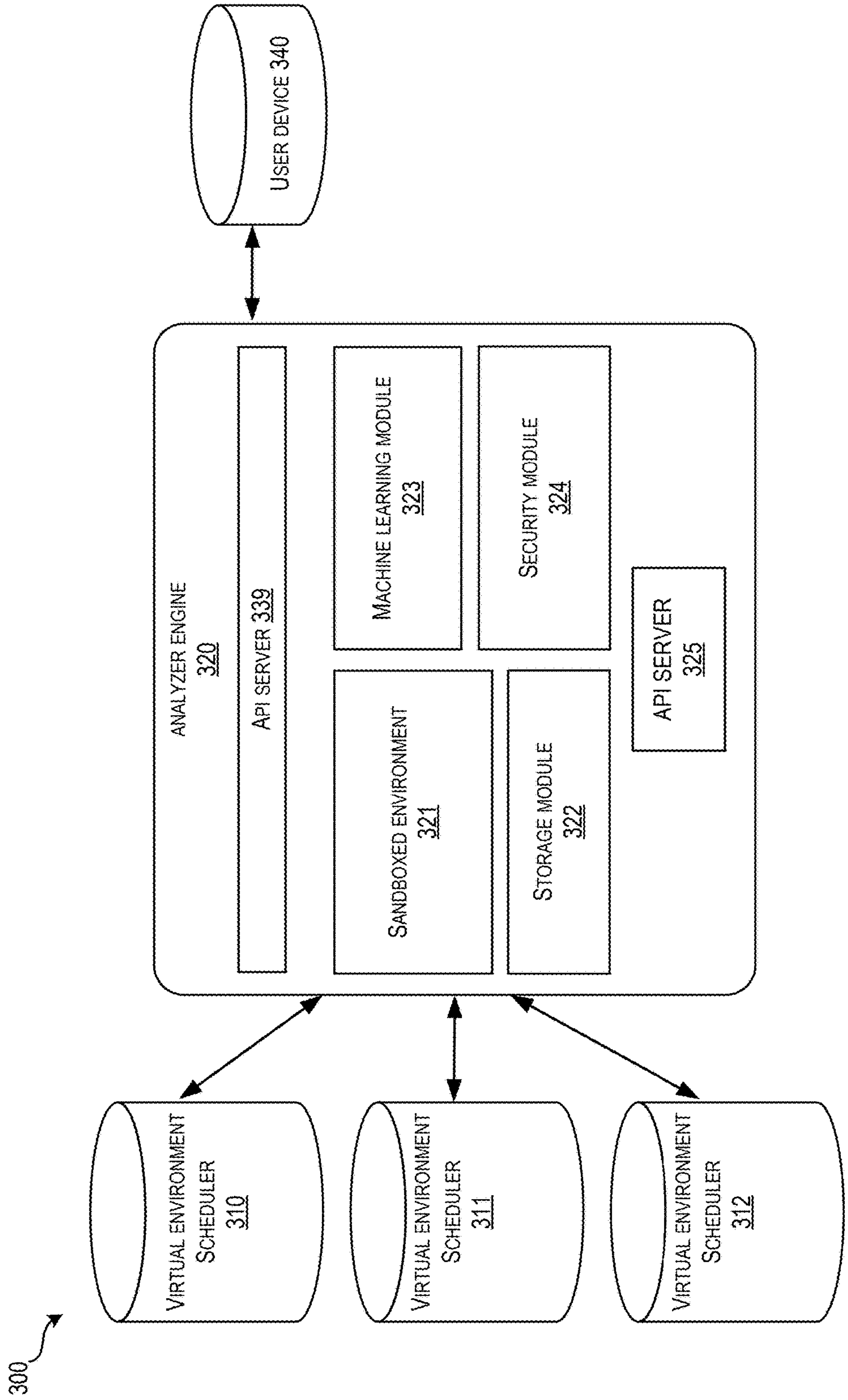
FIG. 3 is an example architecture 300 to receive requests for generating instantiation plans in accordance with at least one embodiment of the disclosed technology.

FIG. 3 is an example architecture 300 to receive requests for generating instantiation plans in accordance with at least one embodiment of the disclosed technology. The architecture 300 provides a framework for generating instantiation schedules for a virtual environment. It includes key components such as the virtual environment schedulers 310-312, an analyzer engine 320, and a user device 340. The analyzer engine 320 may receive requests from one or more virtual environments (e.g., from virtual environment schedulers 310-312) and be configured and/or accessible through the user device 340.

The analyzer engine 320 may include a sandboxed environment 321, a storage module 322, a machine learning module 323, a security module 324, and an API server 325.

The sandboxed environment 321 may simulate the instantiation of pods, nodes, or applications in a controlled setting. By testing various deployment scenarios, it may analyze startup behaviors, resource peaks, and variability in application initialization. The results of these simulations may be transmitted to other modules within the analyzer engine, such as the machine learning module 323 or storage module 322, for further processing.

The storage module 322 may store a wide range of operational data, including historical performance metrics, resource utilization records, startup behavior patterns, and the results of sandboxed simulations. This data may be used by the analyzer engine for real-time decision-making and by the machine learning module for training purposes. For example, the storage module may use a relation database such as MySQL or PostgreSQL. NoSQL databases may be used, such as MongoDB, Cassandra, Redis (an in-memory data structure which may be used as a database, cache, and message broker). File systems may include a distributed file system (e.g., Hadoop Distributed File System (HDFS)), a network file system (NFS), or a local file system. Versioning systems may include version control systems, object storage with versioning, or file versioning systems.

The security module 324 may ensure that all operations performed within the system are secure and compliant with defined policies. It may monitor for vulnerabilities, such as unauthorized access or resource mismanagement, and provide recommendations for mitigating potential risks during workload scheduling and resource allocation. It implements security protocols and measures to protect data and features during storage, transmission, and deployment. The security module 324 may manage access controls, encryption, and other security mechanisms to safeguard the integrity and/or confidentiality of the data.

The API server 325 may facilitate communication between the analyzer engine and external systems or the virtual environment schedulers 310-312. It may handle incoming requests for scheduling plans, resource analysis, and updates to system configurations. It may also facilitate live or real-time communication between the analyzer engine 320 and a virtual environment, allowing for a present state of a virtual environment to be monitored.

The machine learning module (MLM) 323 may use predictive analytics to identify resource utilization trends, potential contention points, and optimal scheduling strategies. It may continuously learn and adapt based on feedback from the virtual environment, refining its algorithms to improve the accuracy and efficiency of scheduling plans over time. This module may leverage machine learning techniques to analyze real-time and historical data, predict resource demands, and create efficient scheduling strategies. The output of the machine learning module 323 may inform the instantiation plans, guiding resource allocation and workload distribution across virtual environments.

The MLM 323 may take inputs from various sources, including resource availability, workload characteristics, and historical data. For instance, it may analyze node-specific data, such as current CPU, memory, and I/O capacity, as well as overall cluster resources. The steady-state resource utilization values of the system may also provide a baseline for evaluating new workload deployments. Inputs related to the type of application, such as its resource demands and startup variability, may further refine the scheduling process. Additionally, the module may account for potential bottlenecks, such as nodes nearing capacity, and consider the history of failures to predict and mitigate deployment risks.

To generate actionable outputs, the MLM 323 may utilize advanced machine learning models designed for time-based scheduling. Techniques such as Recurrent Neural Networks (RNNs) and Long Short-Term Memory (LSTM) networks may be employed to analyze time-series data, including resource usage trends and startup behaviors. These models may allow the system to predict resource spikes during application initialization and adapt scheduling plans accordingly. Reinforcement learning techniques may also be used, allowing the module to simulate and evaluate various scheduling strategies within the sandboxed environment 321, iteratively improving its decision-making based on rewards and penalties. Temporal Convolutional Networks (TCNs) and ensemble methods, such as gradient boosting models, may further enhance the system's ability to handle sequential deployments and identify key factors influencing workload placement.

The outputs of the MLM 323 may include instantiation plans that guide resource allocation and workload scheduling. These plans may specify which nodes should host particular workloads, the timing of deployments to prevent bottlenecks, and fallback mechanisms in case of failures. For instance, the MLM 323 may generate plans that stagger or delay deployments or instantiations of virtual environment components to ensure smooth startup processes while maintaining system stability.

The training of one or more of the machine learning models which may be included in the MLM 323 are further described below with respect to FIG. 6

The user device 340 may be any user device allowing a user to configure and/or interact with the analyzer engine. This may include configuring the analyzer engine 320, modifying the MLMs, visualizing the scheduling plans for critical deployments, updating the security of the analyzer engine, etc. The user device 240 may also provide applications to be simulated with the sandboxed environment 321. The user device 340 may make requests to the analyzer engine 320 and may otherwise interact with the analyzer engine.

A load balancer 239 may be a part of the analyzer engine 320. It may disrupt incoming network traffic across multiple servers and resources within the system to optimize resource use, reduce latency, and ensure high availability. The load balancer ensures that the system can handle high traffic volumes and maintain performance under load.

Figure 4:
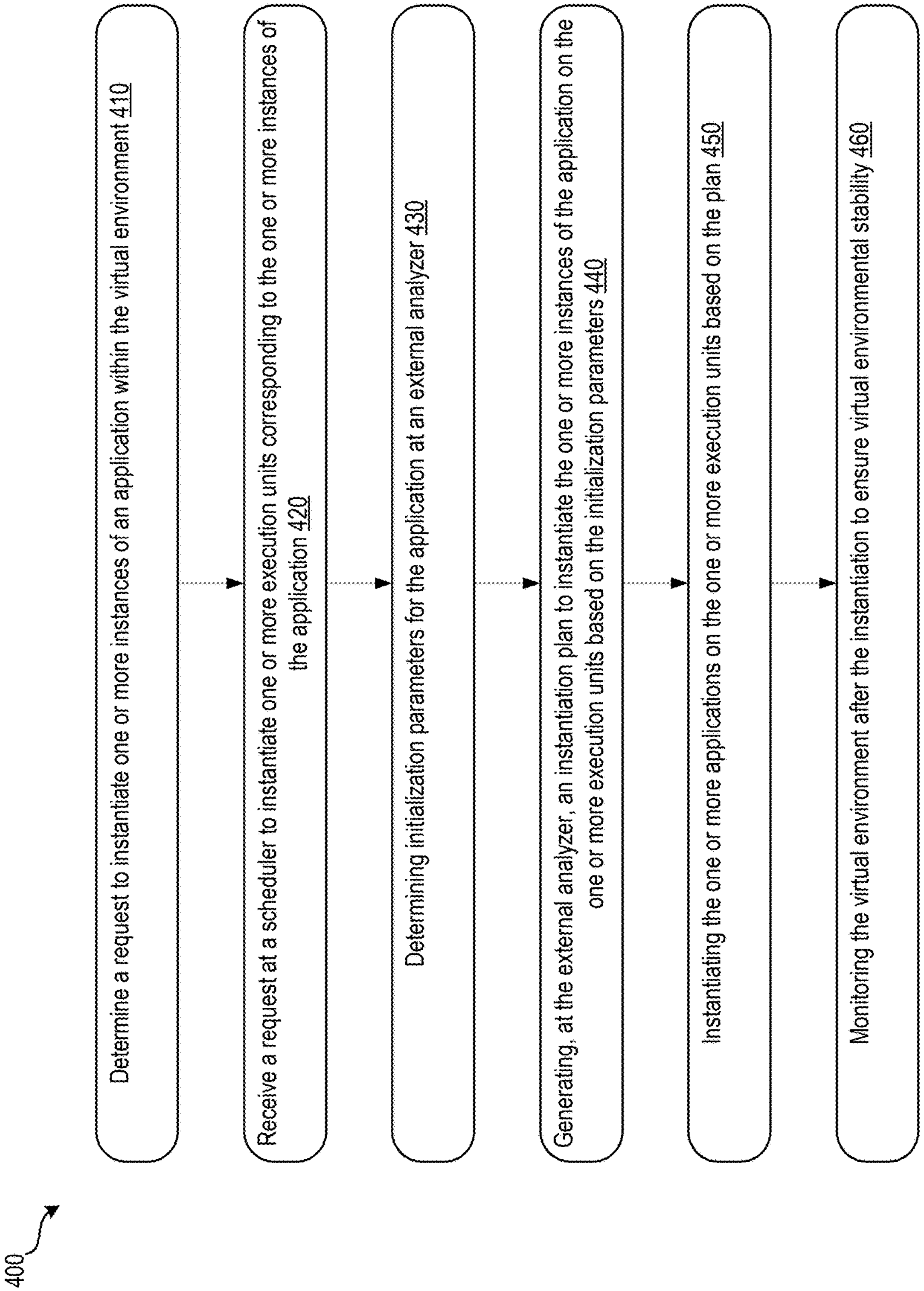
FIG. 4 is an example flow illustrating a process for storing modularized UI features on a cloud environment, 300, in accordance with at least one embodiment of the disclosed technology.

III. Example Methods a. Example Method to Instantiate Execution Units Based on Instantiation Plan FIG. 4 is a block diagram illustrating an example method 400 for instantiating applications in a virtual environment, in accordance with at least one embodiment. A non-transitory computer-readable storage medium may store computer-executable instructions that, when executed by at least one processor, cause at least one computer to perform instructions comprising the operations of the method 400. It should be appreciated that the operations of the method 400 may be performed in any suitable order, not necessarily the order depicted in FIG. 4. Further, the method 400 may include additional, or fewer operations than those depicted in FIG. 4. In some embodiments, method 400 may be executed by components described with respect to FIG. 1 or FIG. 7.

At process block 410, a request to instantiate one or more instances of an application within the virtual environment may be determined. This request may arise from a user input, an automated trigger (e.g., scaling requirements), or application lifecycle events (e.g., updates or deployments). The request may include parameters such as the type of application, the number of instances required, and the application's resource demands. For instance, the system may determine that three instances of a data analytics application must be deployed to accommodate increased user activity.

At process block 420, the request may be received at a scheduler (e.g., scheduler 221) to instantiate one or more execution units corresponding to the application. The scheduler may identify which execution units, such as nodes or containers, are available to host the workloads. It may also evaluate the request against current operational constraints, such as resource availability or system policies. This process ensures that the request is properly acknowledged and processed within the environment.

At process block 430, initialization parameters for the application may be determined at an external analyzer. These parameters may define the resource requirements, dependencies, and startup behaviors specific to the application. The external analyzer may utilize data from previous deployments, real-time system metrics, and results from sandboxed simulations to refine these parameters. For example, it may calculate the resource spikes expected during startup and determine staggered deployment intervals to balance system loads. Thus, the determined initialization parameters may differ from the "steady state" or post-instantiation resource parameters required.

At process block 440, an instantiation plan may be generated at the external analyzer based on the initialization parameters. The instantiation plan may outline the steps to deploy the application efficiently, including which nodes to use, the sequence of instantiations, and the resource allocations required. For example, the plan may specify deploying instance 1 on node-01 immediately, instance 2 on node-02 after a 15-second delay, and instance 3 on node-03 with a priority level of medium. An example instantion plan is described with respect to FIG. 2A.

At process block 450, the one or more applications may be instantiated on the one or more execution units (e.g., nodes, pods) based on the generated plan. During this step, resources are allocated, and workloads are deployed according to the recommendations in the instantiation plan. The virtual environment may dynamically adjust the deployment sequence to prevent contention and ensure smooth operation. For instance, the scheduler may initiate deployments in a staggered manner to minimize overlapping resource peaks. The nodes or pods may have predefined constraints on resources which may be temporarily exceed during the instantiation of an application within the execution unit.

At process block 460, the virtual environment may be monitored after the instantiation to ensure successful application startup and stable operation. Monitoring may involve collecting and analyzing metrics such as CPU and memory usage, startup latency, and workload performance. Feedback loops may identify issues such as resource contention or application failures, and the system may determine whether these issues stem from system-level constraints, deficiencies in the instantiation plan, or unaccounted edge cases. The feedback may be sent to the external analyzer to refine future instantiation strategies.

The features may further provide one or more functions. The one or more functions may be executed in connection with one or more computing devices (e.g., servers 174-176). In some examples, one feature may require communication with multiple servers.

b. Example Method to Instantiate Execution Units Based on Instantiation Plan

Figure 5:
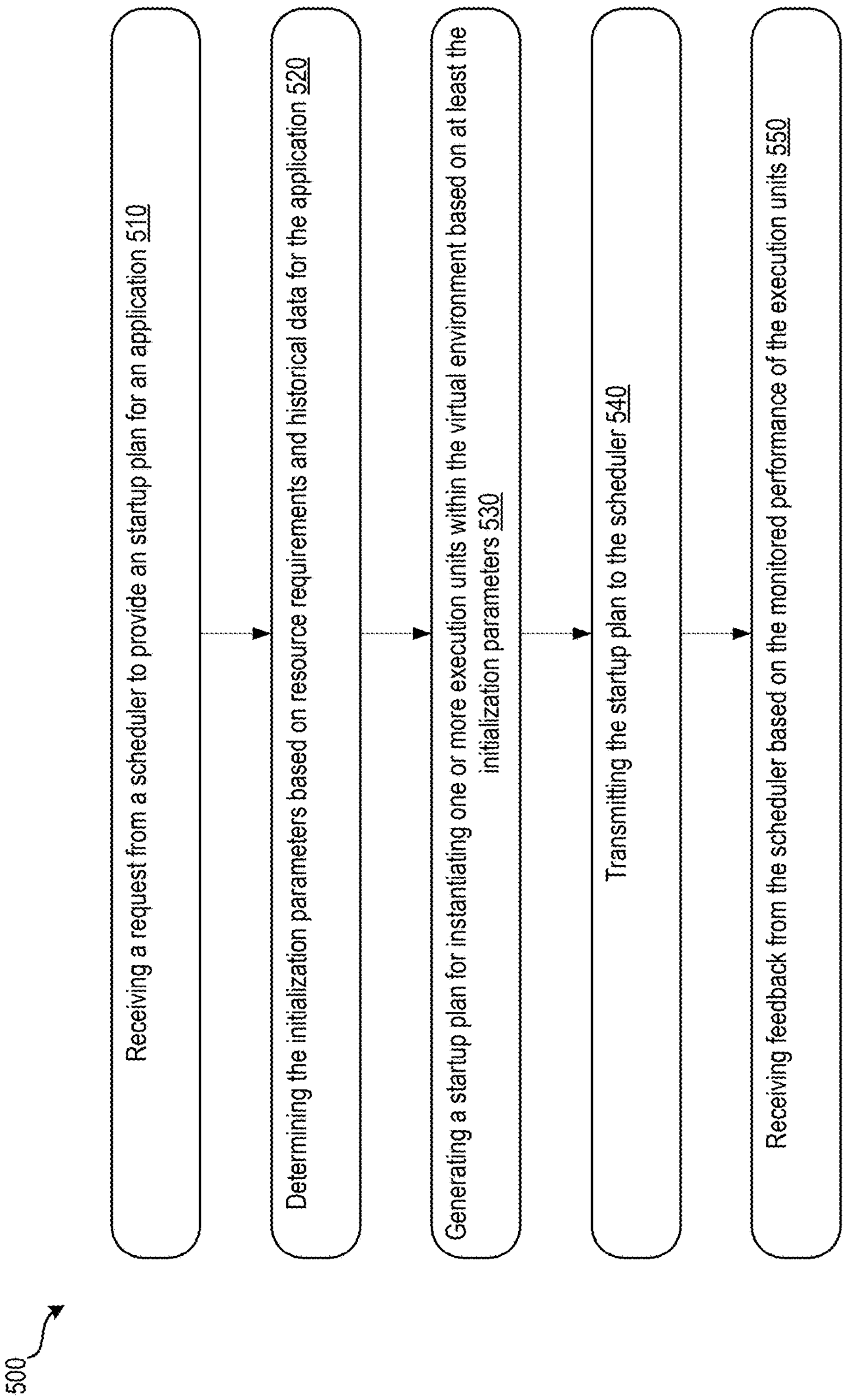
FIG. 5 is a block diagram illustrating an example method 500 utilize an analyzer to control the instantiation of applications within a virtual environment, in accordance with at least one embodiment of the disclosed technology.

FIG. 5 is a block diagram illustrating an example method 500 utilize an analyzer to control the instantiation of applications within a virtual environment, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. In some embodiments, method 500 may be executed by components described with respect to FIG. 1 or FIG. 7.

At process block 510, a request may be received from a scheduler to provide initialization parameters for an application. The scheduler, such as virtual environment scheduler 310, may transmit the request based on a detected need to deploy or scale one or more instances of an application within the virtual environment. This request may include details about the application, such as its type, resource requirements, and deployment context. For example, the scheduler may request initialization parameters for an analytics application with high memory usage to be instantiated during a peak usage period.

At process block 520, initialization parameters may be determined based on resource requirements and historical performance data for the application. The analyzer engine 320 may evaluate the request using data stored in the storage module 322, such as historical metrics related to resource usage, startup behaviors, and previous failures. The sandboxed environment 321 may simulate startup scenarios for the application to identify characteristics such as resource spikes and variability during initialization. These parameters may include CPU and memory allocations, startup latency predictions, and dependency requirements.

At process block 530, a startup plan for instantiating one or more execution units and/or applications within the virtual environment may be generated based on the initialization parameters. The startup plan may define specific steps for initializing the application instances, such as allocating resources to nodes, establishing dependencies, and staggering deployments to prevent resource contention. This plan may account for system-level constraints, such as available nodes and administrative policies. The plan generator 130 within the analyzer engine may work with the machine learning module 323 to refine the plan using predictive analytics. For instance, the machine learning model may analyze patterns of resource contention and suggest modifications to the plan, such as adjusting the sequence or timing of deployments.

At process block 540, the startup plan may be transmitted to the scheduler. The API server 339 of the analyzer engine may facilitate this transmission, ensuring seamless communication between the external analyzer and the scheduler. The scheduler may use the received plan to initiate the deployment process, implementing the specified steps for resource allocation and workload distribution.

At process block 550, feedback may be received from the scheduler based on the monitored performance of the execution units. This feedback loop may include metrics such as resource utilization, startup latency, and any observed failures (or other issues) during the deployment process. In some examples, a "failure" may not be identified and may only be determined by the operational state of the virtual environment components (e.g., an unresponsive component, a component returning a value related to the operation of the component outside of a predetermined value range). The feedback may be analyzed by the machine learning module 323 to identify areas for improvement in the instantiation plan. For example, if resource contention was detected during startup, the plan may be adjusted to stagger deployments further or allocate additional resources. If the "spike" in resource usage was underestimated, an updated value may be provided to the MLM 323 to improve the instantation.

c. Example Method to Train Machine Learning Models

Figure 6:
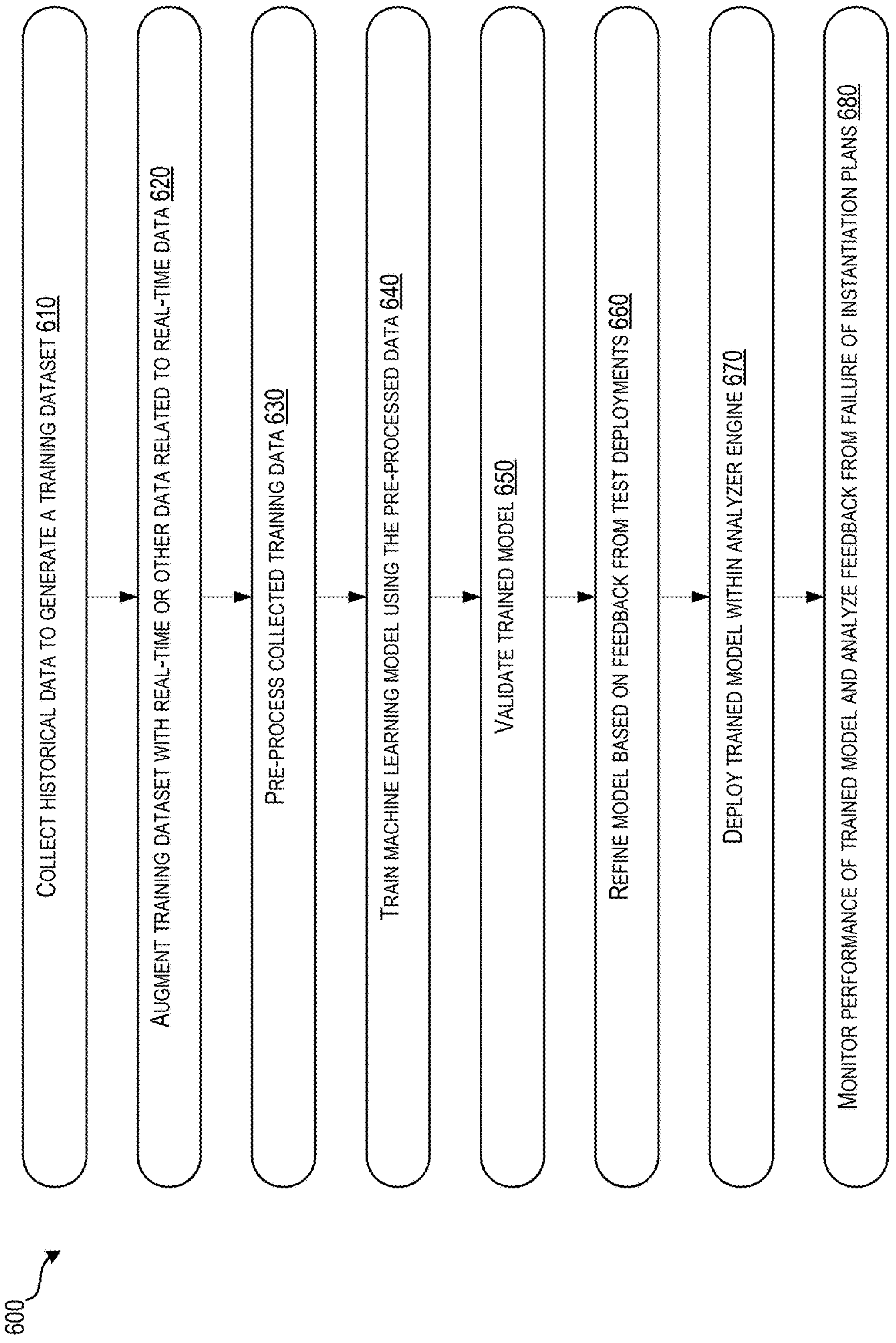
FIG. 6 is an example flow illustrating a process for executing modularized UI features, 400, in accordance with at least one embodiment of the disclosed technology.

FIG. 6 illustrates a method 600 for training the machine learning model in accordance with at least one embodiment of the disclosed technology. The process may be performed by components of the analyzer engine 320, such as the machine learning module 323, in collaboration with other modules, including the storage module 322 and the sandboxed environment 321. Method 600 outlines the systematic steps for creating, refining, and deploying a machine learning model for generating optimized instantiation plans in a virtual environment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. In some embodiments, method 600 may be executed by components described with respect to FIG. 1 or FIG. 7.

At process block 610, historical operational data may be collected from various sources within the virtual environment. This data may include metrics such as resource utilization, application startup behaviors, node-level resource constraints, and failure logs. For example, startup variability patterns, resource peaks, and steady-state resource usage values may be extracted from previous deployments stored in the storage module 322. Inter-application dependencies and system-wide operational metrics may also be included to build a comprehensive dataset.

At process block 620, real-time data may be aggregated to enrich the training dataset. This may involve continuously monitoring operational metrics, such as node health, current workload demands, and resource usage, during live deployments. Additionally, simulated data from the sandboxed environment 321, such as startup behavior under different conditions or alternative allocation strategies, may be included to account for scenarios not encountered in live operations. This combination of historical and real-time data ensures that the training dataset represents diverse scenarios and edge cases.

At process block 630, the collected data may be preprocessed to prepare it for machine learning training. Preprocessing may include cleaning the data to remove noise and inconsistencies, normalizing metrics for uniformity, and engineering features relevant to the scheduling process. Key features may include resource utilization trends, application priority levels, and dependency chains. Dimensionality reduction techniques, such as PCA, may be applied to streamline large datasets, reducing computational overhead during training.

At process block 640, an initial machine learning model may be trained using the preprocessed data. Models suitable for time-based scheduling, such as Recurrent Neural Networks (RNNs), Long Short-Term Memory (LSTM) networks, or reinforcement learning models, may be utilized. The model may take as input features like resource availability, workload characteristics, and startup variability patterns. The target output may include predicted resource utilization, workload contention risks, and optimal scheduling strategies. The training process may involve iteratively adjusting model parameters to minimize prediction errors.

At process block 650, the trained model may be validated and tested using a separate test dataset. This dataset may include a mix of historical and real-time data to ensure the model performs well under diverse conditions. Performance metrics, such as prediction accuracy, error rates, and the ability to identify potential bottlenecks, may be assessed. Additionally, the model's predictions may be compared against actual deployment results from previous operations to evaluate its practical utility.

At process block 660, the model may be refined based on feedback from live deployments. Feedback loops may identify discrepancies between predicted and actual outcomes, such as cases where the generated instantiation plan led to resource contention or failed deployments. The system may analyze the root cause of such failures to determine whether they were due to system-level issues, inadequacies in the plan, or unknown fringe cases. This feedback may be incorporated into the training dataset to improve the model's adaptability and robustness.

At process block 670, the trained and validated model may be deployed within the analyzer engine 320 for real-time use. The model may dynamically generate optimized instantiation plans based on live input from the virtual environment scheduler 310 and other system components. The deployed model may be integrated with other modules to ensure seamless execution of scheduling strategies.

At process block 680, the performance of the deployed model may be continuously monitored. This step may involve analyzing feedback from the virtual environment to detect patterns of inefficiency or failure. When the model generates an inadequate plan or when unexpected failures occur, additional feedback loops may be triggered to investigate the issue. For instance, failures may be categorized as system-level issues, deficiencies in the model's predictions, or previously unaccounted fringe cases. These insights may guide further refinement of the model, ensuring continuous improvement in its ability to handle complex and dynamic scheduling scenarios.

IV. Example Computing Device

Figure 7:
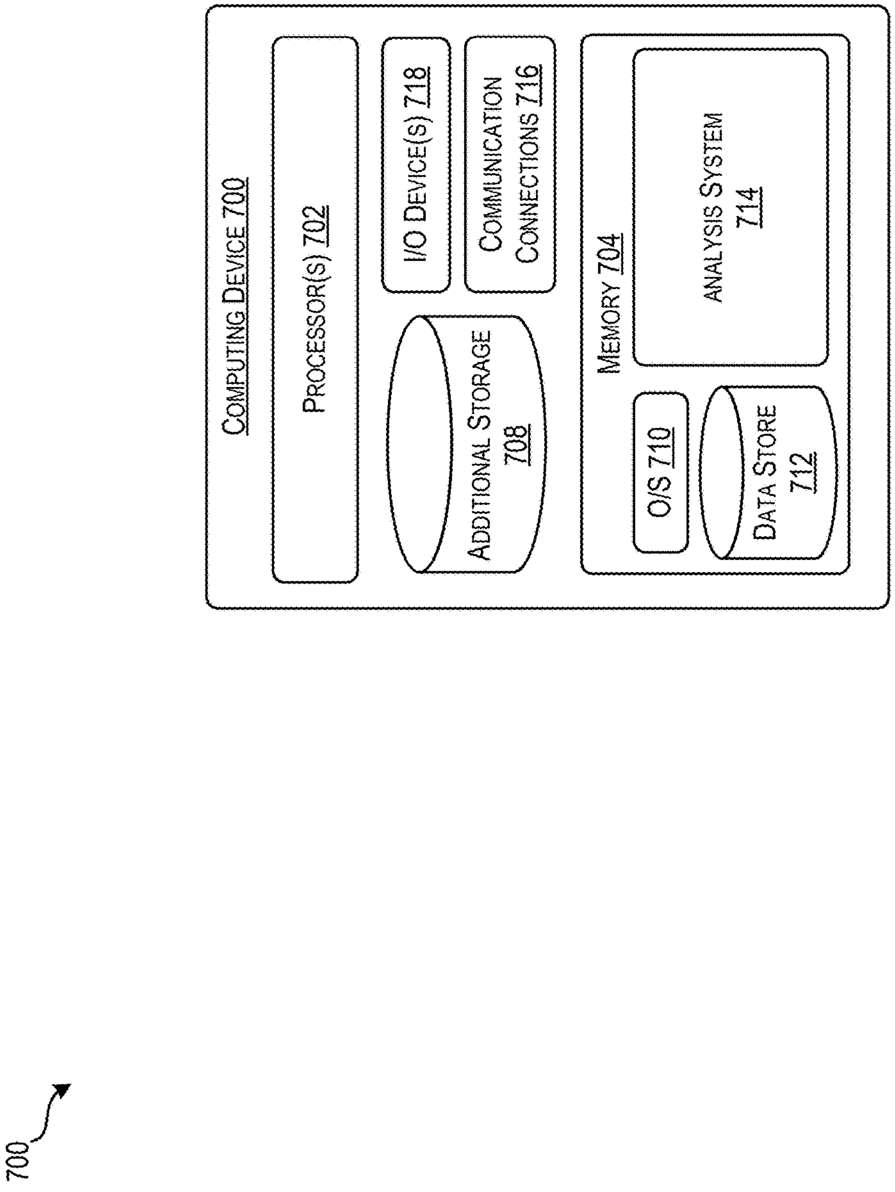
FIG. 7 illustrates an example computing device that may implement the methods disclosed herein.

FIG. 7 illustrates an example computing device 700 that may implement the methods disclosed herein. In some embodiments, the computing device 700 may include one or more processors (e.g., processor(s) 702). The processor(s) 702 may be implemented in hardware, computer-executable instructions, firmware, or combinations thereof. Computer-executable instruction or firmware implementations of the processor(s) 702 may include computer-executable or machine-executable instructions written in any suitable programming language.

Computing device 700 may include memory 704. The memory 704 may store computer-executable instructions that are loadable and executable by the processor(s) 702, as well as data generated during the execution of these programs. The memory 704 may be volatile (such as RAM) and/or non-volatile (such as ROM, flash memory, etc.). The computing device 700 may include additional storage 706, which may include removable storage and/or non-removable storage. The additional storage 706 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 704 or additional storage 706 may individually, or collectively, include multiple different types of memory, such as SRAM, DRAM, or ROM.

The memory 702 and/or additional storage 704 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 702 and the additional storage 704 are examples of computer storage media. Memory 702 and/or additional storage 704 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 700. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 704 may include an operating system 708 and one or more data stores 710, a analysis system 714 and/or one or more application programs, modules, or services for implementing the features disclosed herein. In some examples, the analysis system 714 may be similar to the analyzer engine 320 described above with respect to FIG. 3 or the analyzer engine 122 described with respect to FIG. 1. In some examples, the analysis system may be implemented on a server, a combination of server computing devices, and/or at a user device. In some examples, the analysis system 714 may be instantiated and executed on a cloud environment. Multiple instances of the feature delivery engine 714 may be generated within multiple cloud environments and/or within multiple virtual machines. The analysis system 714 may ensure that features are correctly managed, stored, and delivered to the appropriate destinations while maintaining security and version control. The analysis system 714 may include storage, delivery, version management, and security capabilities.

The computing device may also contain communications connection(s) 716 that allow the computing device 700 to communicate with a stored database, another computing device, a server, user terminals and/or other devices (e.g., via one or more networks, not depicted). The computing device may also include I/O device(s) 718, such as a keyboard, a mouse, a pen, a voice input device, a touch input device, a display, speakers, a printer, etc.

In some examples, such as during an increase in banking transactions, consumer transactions, or consumer demand, the disclosed technology can be used to increase the number of individual execution units (e.g., pods) to ensure that the consumer demand is met. The request may be an increase received at an external load balancer which is connected to a control plane. The scheduler can determine the number of units which may be required to meet the increased demand placed on that specific application or functionality (e.g., payment processing, bill clearing, etc.). A direct instantiation of the determined number of units may cause the virtual machine to crash, hang, or otherwise exhibit unstable behavior. Thus, the control plane and/or scheduler may use an analyzer engine to determine an instantiation plan. The instantiation plan may include one or more methods through which the execution units may be instantiated. As one example, the instantiation plan may include a staggered deployment of the units. In another example, the instantiation plan may be already stored based on previously generated plans and provided by matching the current requirements to previously known requirements. In yet other examples, the instantiation plan may include a number of units which may be instantiated at once and "release" other pods as being available once it receives confirmation that a pod has been instantiated. The analyzer engine (or other component) may base "releasing" a pod (e.g., by making a pod as being unavailable to being available to the scheduler) based on time requirements (e.g., knowing the pod has been active for a certain period of time in which its behavior and resource requirements stabilize) or based on real time data (e.g., reading the active use or most recent use of a particular pod that was most recently instantiated). In this manner, the increase in requirements on the virtual environment may be met without disruption to the system.

As another example, during the "patching" of a critical vulnerability by transmitting a new version of a virtual software or other virtual image to each pod, each pod may need to be instantiated afresh. In this example, it may be desirable to patch all the machines in the smallest amount of time. This may be scheduled to avoid a service being unavailable to customers for a long period of time. In this example, the amount of "downtime" for the service may be minimized by using an analyzer engine to generate an instantiation plan which minimizes the time required to instantiate the pods with the new version of the software. In this example, the analyzer engine may have simulated the new version of the virtual image (containing for example, the applications) to determine startup requirements and peaks in resources for the new virtual image.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for managing application startup within a virtual environment, the method comprising:

a determining operational requirements of the virtual environment, the operational requirements related to instantiation of one or more instances of an application within the virtual environment;

receiving a request at a scheduler to instantiate one or more execution units corresponding to the one or more instances of the application within the virtual environment;

determining by the scheduler a number of execution units corresponding to the one or more instances of the application within the virtual environment to meet the operational requirements;

determining initialization parameters for the application at an external analyzer based at least in part on resource utilization of the application gathered from prior instantiations of the application, the initialization parameters defining a resource requirement, a dependency, and a startup behavior of the application;

generating, at the external analyzer, an instantiation plan to instantiate the one or more instances of the application on one or more execution units based at least in part on the initialization parameters, the instantiation plan specifying a prioritization and a sequence for instantiating the one or more instances of the application on the one or more execution units, the sequence including staggering that is based on the dependency and the startup behavior, and the instantiation plan further including one or more fallback mechanisms specifying alternative execution units and retry policies to be employed if instantiation of an instance fails;

instantiating the one or more instances of the application on the one or more execution units based at least in part on the instantiation plan, wherein instantiating the one or more instances of the application comprises initializing virtual resources for the one or more execution units and executing the one or more instances of the application; and monitoring the virtual environment for stability of the virtual environment after instantiating the number of execution units after instantiating the one or more instances of the application.

2. The method of claim 1, further comprising communicating with the external analyzer and by the scheduler via an application programming interface (API).

3. The method of claim 1, wherein the initialization parameters include central processing unit (CPU) requirements and memory requirements.

4. The method of claim 1, further comprising determining the initialization parameters from a database based on data for the application.

5. The method of claim 1, further comprising monitoring a performance of the virtual environment during an implementation of the instantiation plan and providing feedback to the external analyzer.

6. The method of claim 5, wherein monitoring the virtual environment includes detecting resource contention or crashes during the instantiating of the one or more instances of the application.

7. The method of claim 1, wherein the instantiation plan includes staggering instantiation of the one or more execution units to prevent resource contention.

8. The method of claim 1, wherein the instantiation plan maximizes the number of execution units deployable at a time without causing instability in the virtual environment.

9. The method of claim 1, further comprising monitoring the instantiating of the of the one or more execution units to generate updated data to be stored in a database accessible by the external analyzer.

10. The method of claim 1, further comprising employing a machine learning model trained to determine the initialization parameters.

11. The method of claim 10, further comprising employing the machine learning model to generate the instantiation plan.

12. The method of claim 1, wherein the initialization parameters are stored in a database that can be updated via an API by one or more virtual environment schedulers.

13. The method of claim 1, wherein the external analyzer simulates instantiating at least one instance of the application to determine the initialization parameters.

14. The method of claim 13, further comprising simulating the virtual environment within a sandboxed environment of the external analyzer.

15. The method of claim 14, further comprising testing the instantiation plan by executing the instantiation plan on the sandboxed environment simulating the virtual environment.

16. A computing system, comprising:

one or more memories configured to store computer-executable instructions; and one or more processors configured to access the one or more memories and execute the computer-executable instructions to at least:

determine operational requirements of a virtual environment, the operational requirements related to instantiation of one or more instances of an application within the virtual environment;

receive a request at a scheduler to instantiate one or more execution units corresponding to the one or more instances of the application within the virtual environment; determine by the scheduler a number of execution units corresponding to the one or more instances of the application within the virtual environment to meet the operational requirements;

determine initialization parameters for the application at an external analyzer based at least in part on resource utilization of the application gathered from prior instantiations of the application, the initialization parameters defining a resource requirement, a dependency, and a startup behavior of the application;

generate, at the external analyzer, an instantiation plan to instantiate the one or more instances of the application on one or more execution units based at least in part on the initialization parameters, the instantiation plan specifying a prioritization and a sequence for instantiating the one or more instances of the application on the one or more execution units, the sequence including staggering that is based on the dependency and the startup behavior, and the instantiation plan further including one or more fallback mechanisms specifying alternative execution units and retry policies to be employed if instantiation of an instance fails;

instantiate the one or more instances of the application on the one or more execution units based at least in part on the instantiation plan, wherein instantiating the one or more instances of the application comprises initializing virtual resources for the one or more execution units and executing the one or more instances of the application; and monitor the virtual environment for stability of the virtual environment after instantiating the number of execution units.

17. The computing system of claim 16, wherein the instantiation plan includes staggering instantiation of the one or more execution units to prevent resource contention.

18. A non-transitory computer-readable medium containing instructions, that when executed by one or more processors, are configured to cause the one or more processors to perform operations comprising: determining operational requirements of a virtual environment, the operational requirements related to instantiation of one or more instances of an application within the virtual environment;

receiving a request at a scheduler to instantiate one or more execution units corresponding to the one or more instances of the application within the virtual environment;

determining by the scheduler a number of execution units corresponding to the one or more instances of the application within the virtual environment to meet the operational requirements;

determining initialization parameters for the application at an external analyzer based at least in part on resource utilization of the application gathered from prior instantiations of the application, the initialization parameters defining a resource requirement, a dependency, and a startup behavior of the application;

generating, at the external analyzer, an instantiation plan to instantiate the one or more instances of the application on one or more execution units based at least in part on the initialization parameters, the instantiation plan specifying a prioritization and a sequence for instantiating the one or more instances of the application on the one or more execution units, the sequence including staggering that is based on the dependency and the startup behavior, and the instantiation plan further including one or more fallback mechanisms specifying alternative execution units and retry policies to be employed if instantiation of an instance fails;

instantiating the one or more instances of the application on the one or more execution units based at least in part on the instantiation plan, wherein instantiating the one or more instances of the application comprises initializing virtual resources for the one or more execution units and executing the one or more instances of the application; and monitoring the virtual environment for stability of the virtual environment after instantiating the number of execution units after instantiating the one or more instances of the application.

19. The non-transitory computer-readable medium containing instructions of claim 18, wherein the instantiation plan includes staggering instantiation of the one or more execution units to prevent resource contention.

20. The non-transitory computer-readable medium containing instructions of claim 18, wherein the instantiation plan maximizes the number of execution units deployable at a time without causing instability in the virtual environment.

* * * * *